Patented May 14, 1935

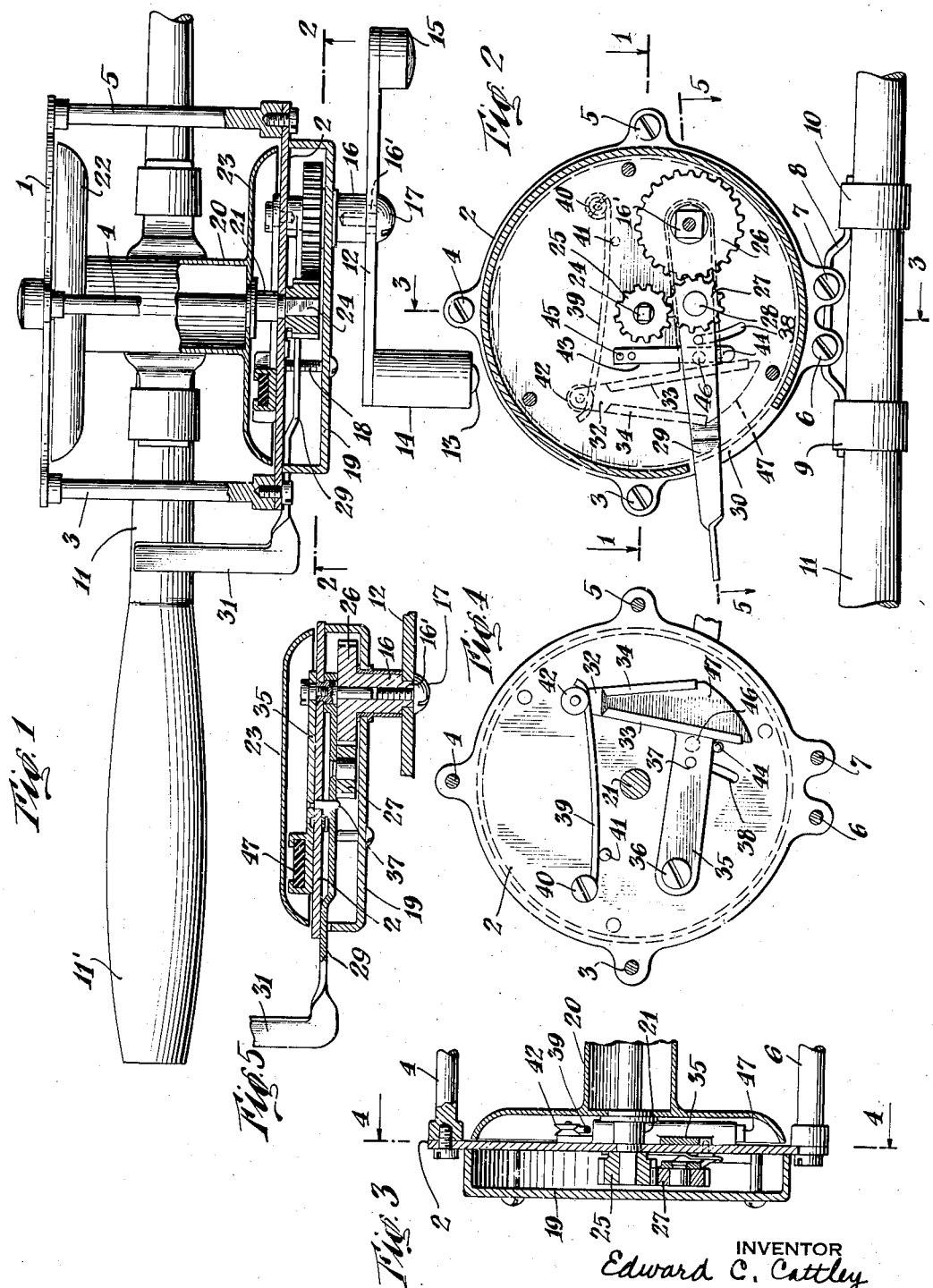

2,001,521

UNITED STATES PATENT OFFICE 2,001,521

FISHING REEL

Edward C. Cattley, Brooklyn, N. Y.

Application December 3, 1934, Serial No. 755,684

11 Claims. (Cl. 242—84.5)

This invention relates to fishing reels and has for one of its objects to provide reel with a simple control device operable by the hand used in holding the reel butt for setting the reel mechanism in proper order for casting, fishing and winding operations.

I am aware that it is an old expedient to provide reels with clutch mechanisms so that the gears employed in the winding operation may be disengaged for casting purposes. I am also aware that it is an old expedient to provide the reel with brake, or drag, devices for setting up a tension in the line, for fishing purposes. It is true that some of the conventional reels are provided with easily operated levers for throwing the winding gears out of mesh when casting. However, in those reels that call for a braking device, the control means therefor is invariably independent of the clutch control so as to call for a multiple manual control. Moreover, those of the conventional reels that have any appreciation of the desirability of having such a clutch device and braking device, provide such braking devices with means for setting the brake at a predetermined position to produce a predetermined amount of drag. This is impractical in practice as the drag necessary varies in accordance with different requirements. Thus the drag imposed is most apt to be either more or less than that required.

It is therefore an object of this invention first to provide a single simply operated lever easily operable by the hand carrying the reel butt for operating both the clutch and the brake.

It is another object of the invention to arrange the reel mechanism and control, that the single control lever may be easily operated into casting, fishing and winding positions with the one hand carrying the reel butt.

A further object is to arrange the braking mechanism that a simple pressing of the hand lever accomplishes a drag variable in accordance with the amount of pressure exerted on the hand lever.

A further object is to provide a simplified brake that will have the maximum braking effect upon the minimum effort applied on the hand lever for producing the braking effect over maximum range of variation within its limits.

With the foregoing and other objects in view, the invention resides in the combination of parts and in the details of construction hereinafter set forth in the following specification and appended claims, certain embodiments thereof being illustrated in the accompanying drawing, in which:

Figure 1 is a top plan view partly in section of the fishing reel and the rod;

Figure 2 is a view in section taken along line 2—2 of Figure 1;

Figure 3 is a view in section taken along line 3—3 of Figure 2;

Figure 4 is a view in section taken along line 4—4 of Figure 3;

Figure 5 is a view in section taken along line 5—5 of Figure 2.

Referring more particularly to the drawing, the reel may have the usual end plates 1 and 2 with cross braces 3, 4, 5, 6 and 7 extending therebetween and connected to corresponding ears formed on the end plates, as is in the conventional arrangement. For purposes of brevity the screws for connecting the cross braces to plate 2 will be given the same reference numbers as the cross braces of which they form the means of connection. Likewise there may be used the conventional angular plate 8 through which cross braces 6 and 7 extend, and a pair of attaching rings 9 and 10 for clamping the plate 8 and securing the reel to the rod 11, the hand grip portion of which is indicated at 11'.

The winding handle may comprise a flat bar 12 to which is secured a stud 13 for receiving a relatively rotatable barrel 14 for hand grasp. The bar may have a counterweight 15 secured at its other end. Intermediate its ends the bar has a rectangular opening to fit over the reduced and similarly shaped extension 16' of a spindle 16, after which the attachment screw 17 is screwed into the spindle to clamp the bar thereto so that a rotation of the handle effects a rotation of the spindle. Secured by such screws as 18 to the end plate 2 is a bakelite cover 19 for housing the reel mechanism about to be described.

The spool is provided with the usual hollow hub 20 and shaft 21 secured thereto or the end flanges 22 and 23 which are concave on their outer faces and rest on the usual bearing surfaces provided on the end plates 1 and 2 for rotation thereon. Shaft 21 bears against end plate 2 and has a reduced rectangular extension 24 extending through that end plate to receive a gear 25. This gear may be removable but when placed on extension 24 it is rotatable therewith.

Spindle 16 has either integral therewith or fixed thereto a gear 26 of relatively greater dimensions than gear 25. As will be readily understood in order for the reel to be wound the shaft 21 and the gear 25 must be rotated. Therefore an idler gear 27 of substantially the same dimensions as gear 25 is interposed between the latter and gear 26. When in the meshing relationship shown in Figures 1 or 2, a winding of the handle in the proper direction causes the spool to rotate and the fishing line to be wound. However, in order to provide a clutch device to make it possible to cast the line without the meshing of gears, the idler gear 27 may be carried by a stud 28 carried by a bar 29. This bar is pivoted around the spindle 16 and extends through an elongated recess 30 in the cover 19. The bar 30 is preferably formed with an inwardly extending thumb piece 31 for convenient engagement by the same hand used in gripping the reel butt 11'. Thus a downward pressure on the thumb piece of the lever swings gear 27 out of mesh with gear 25 while gear 27 stays in mesh with gear 26. Thus the spool is free to rotate for casting purposes. A simple upward pressure on the thumb piece again swings the gear 27 into mesh with gear 25 for winding purposes.

As to the braking device there is first of all provided an improved brake shoe. Instead of applying the brake to the hub shaft itself, it is found preferable to apply braking pressure to the spool flange. This is because less pressure at a point removed from the axis of rotation is necessary to provide the required braking effect. Such a shoe is shown at 32 in Figure 4 channelled with overturned edges 33 and 34. The side wall of the shoe is inclined upwardly from its larger and lower end toward the smaller and upper end. A suitable block 47 of leather or rubber or the like is removably fitted in the shoe so as to end slightly above the side walls and this block is inclined accordingly as the side walls of the shoe. This shoe is carried on the end plate 2 by means of an arm 35 pivoted at 36 and fixed to the brake shoe. This arm also carries a stud 37 that rides in an arcuate slot 38 in the end plate 2 and is connected to the arm 35 so that a movement of the lever 29 causes a corresponding movement of the brake shoe.

The shoe is kept normally in the upper inactive position shown in Figure 4 by means of a spring 39 fixed to the end plate 2 at 40 and bearing on the upper surface of a pin 41. The upper end of the shoe may have a roller 42 to provide a roller bearing for the spring 39 and reduce the friction in this engagement. In order to maintain the winding device in normal operative position, as shown in Figure 2, in which gears 25 and 27 mesh, and also in order to maintain the brake in an inoperative position, as shown in Figure 4, in which the brake shoe is in its upper position, there may be provided a spring clip 43 with a stud 44. This clip is secured at 45 to the end plate 2 and the stud 44 is carried near the other end of the clip. The stud, as shown in Figure 4, bears on the lower edge of lever 35. A downward pressure on lever 35 transmitted on pin 37 through downward operation of lever 29 causes the clip to flex and allow the lever 35 to ride over the stud.

Thus when it is desired to render the spool free-running for casting purposes, the lever 29 is pushed downwardly a short distance and at the time when the gear 27 is brought out of mesh with gear 25 the plunger stud 44 will have snapped into a circular recess 46, shown in Figure 4 in dotted lines, of lever 35, so as to resiliently hold the lever 29 and lever 35 in a definite position. At this position the brake will not be applied.

For inducing a drag or brake on the line for fishing purposes it is then merely necessary to press the lever 29 further downwardly past the position at which the plunger stud 44 engages the recess 46. Such a movement, by means of the apparatus described, causes a downward movement of the brake shoe. Due to the incline of the shoe and its filler, or block, 47 the latter bears on the inclined concave walls of flange 23 and brakes the spool. Accordingly the braking effect is proportional to the amount of downward pressure on the thumb piece 31. Furthermore, the adjustment of the braking effect, once initiated, is not measured in steps, nor is it set for predetermined amounts. In other words the braking effect is variable in accordance with merely the movement of a simple lever operable about a simple pivot and therefore the range between a zero braking effect and a maximum one is infinite. Moreover the slacking up and release of the braking force applied is automatically accomplished upon release of pressure on the thumb piece by reason of spring 39. The regulation for desired effects is accomplished by pressure and release of pressure on the thumb piece. A manual upward movement of the thumb piece is necessary only when returning the lever from casting to winding positions and this is easily accomplished by a simple upward flip of the thumb of the hand holding the reel butt.

I claim:

1. In a reel, a spool having a flange, a rod, a winding apparatus and a control therefor, a device for rendering at will the winding apparatus effective or ineffective, a braking means for said spool, a single control lever for operating said device and said braking means, said braking means being adapted to exert its braking effect on the surface of said spool flange in a plane substantially tangentially disposed with respect to its axis of rotation.

2. In a reel, a spool having a flange, a rod, a winding apparatus and a control therefor, a device for rendering at will the winding apparatus effective or ineffective, a braking means for engaging the surface of said spool flange, a single control lever for operating said device and said braking means adapted to be operated by the same hand employed in supporting the rod.

3. In a reel, a flanged spool and, a rod, a winding apparatus and a control therefor, a device for rendering at will the winding apparatus effective or ineffective, a braking means for directly engaging a flange of said spool, a single control lever for operating said device and said braking means, said braking means being positively operated by said control therefor and capable of infinite adjustment within its limits.

4. In a reel, a spool having a flange, a rod, a winding apparatus and a control therefor, a device for rendering at will the winding apparatus effective or ineffective, a braking means for tangentially engaging the surface of said spool flange, a single control lever for operating said device and said braking means, said braking means and control therefor being ineffective when said winding apparatus is in operative position.

5. In a reel, a flanged spool and a rod, a winding apparatus and a control therefor, a clutch arrangement for rendering at will the winding apparatus effective or ineffective, a braking device for directly engaging a flange of said spool, a single control lever for operating said clutch and said braking device, said braking device being positively operated by said control therefor and capable of infinite adjustment within its limits, said braking device and control therefor being ineffective when said winding apparatus is in operative position.

6. In a reel, a spool and a rod, a gear carried by said spool, a winding means including a winding handle and a gear driven thereby, an idler gear between said gears, said idler gear and the gear driven by said winding handle being in constant mesh and carried by a single pivoted lever for moving said idler in and out of mesh with said first gear, said lever being operable by the same hand employed for supporting said rod, said being connected to said lever and effective when said lever is in its upper position and ineffective when said lever is moved to a predetermined position below said upper position.

7. In a reel, a spool and a rod, a gear carried by said spool, a winding means including a winding handle and a gear driven thereby, an idler gear between said gears, said idler gear and the gear driven by said winding handle being in constant mesh and carried by a pivoted lever for moving said idler in and out of mesh with said first gear, said lever being operable by the same hand employed for supporting said rod, said being connected to said lever and effective when said lever is in its upper position and ineffective when said lever is moved to a predetermined position below said upper position, a braking device connected to said lever and adapted to be effectively operated upon a movement of said lever downwardly with respect to said predetermined position.

8. In a reel, a spool and a rod, a gear carried by said spool, a winding means including a winding handle and a gear driven thereby, an idler gear between said gears, said idler gear and the gear driven by said winding handle being in constant mesh and carried by a pivoted lever for moving said idler in and out of mesh with said first gear, said lever being operable by the same hand employed for supporting said rod, said being connected to said lever and effective when said lever is in its upper position and ineffective when said lever is moved to a predetermined position below said upper position, a braking device connected to said lever and adapted to be effectively operated upon a movement of said lever downwardly with respect to said predetermined position, resilient means for normally urging said lever upwardly and said braking device out of effective operating position.

9. In a reel, a spool and a rod, a gear carried by said spool, a winding means including a winding handle and a gear driven thereby, an idler gear between said gears, said idler gear and the gear driven by said winding handle being in constant mesh and carried by a pivoted lever for moving said idler in and out of mesh with said first gear, said lever being constituting a clutch control and operable by the same hand employed for supporting said rod, said being connected to said lever and effective when said lever is in its upper position and ineffective when said lever is moved to a predetermined position below said upper position, a braking device connected to said lever and adapted to be effectively operated upon a movement of said lever downwardly with respect to said predetermined position, resilient means for normally urging said lever upwardly and said braking device out of effective operating position, said braking device constituting a brake shoe positively operated by said lever to be brought into and out of impinging braking relationship with said spool in a plane substantially tangentially disposed with respect to the axis of rotation thereof.

10. In a reel, a spool and a rod, a gear carried by said spool, a winding means including a winding handle and a gear driven thereby, an idler gear between said gears, said idler gear and the gear driven by said winding handle being in constant mesh and carried by a pivoted lever for moving said idler in and out of mesh with said first gear, said lever being constituting a clutch control and operable by the same hand employed for supporting said rod, said being connected to said lever and effective when said lever is in its upper position and ineffective when said lever is moved to a predetermined position below said upper position, a braking device connected to said lever and adapted to be effectively operated upon a movement of said lever downwardly with respect to said predetermined position, resilient means for normally urging said lever upwardly and braking device out of effective operating position, said braking device constituting a brake shoe positively operated by said lever to be brought into and out of impinging braking relationship with said spool in a plane substantially tangentially disposed with respect to the axis of rotation thereof, said braking device being capable, by means of said lever and said brake shoe, of infinite variations in adjustment within its limits for accordingly varying the braking effect.

11. In a reel, a spool and a rod, a gear carried by said spool, winding means including a winding handle and a gear driven thereby, an idler gear between said gears, said idler gear and the gear driven by said winding handle being in constant mesh and carried by a manually operated control member for moving said idler in and out of mesh with said first gear, said control member being operable by the same hand employed for supporting said rod, said winding means being connected to said control member and effective when said control member is in a predetermined position and ineffective when said control member is moved to a predetermined extent in one direction away from said predetermined position, a braking device connected to said control member and adapted to be effectively operated upon a further movement of said control member past said predetermined extent in the same direction away from said predetermined point.

EDWARD C. CATTLEY.